United States Patent
Meyerowitz et al.

(10) Patent No.: US 11,099,987 B2
(45) Date of Patent: Aug. 24, 2021

(54) BIT MASKING VALID SECTORS FOR WRITE-BACK COALESCING

(71) Applicant: Micron Technology, Inc., Boise, ID (US)

(72) Inventors: Trevor C. Meyerowitz, Morgan Hill, CA (US); Dhawal Bavishi, San Jose, CA (US); Fangfang Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/697,510

(22) Filed: Nov. 27, 2019

(65) Prior Publication Data
US 2021/0157727 A1 May 27, 2021

(51) Int. Cl.
*G06F 12/08* (2016.01)
*G06F 12/0804* (2016.01)

(52) U.S. Cl.
CPC .. *G06F 12/0804* (2013.01); *G06F 2212/1032* (2013.01)

(58) Field of Classification Search
CPC .................. G06F 12/08; G06F 2212/1032
USPC .......................................................... 711/118
See application file for complete search history.

(56) References Cited

U.S. PATENT DOCUMENTS

| | | | | |
|---|---|---|---|---|
| 6,085,288 | A * | 7/2000 | Arimilli | G06F 12/0831 711/113 |
| 8,019,925 | B1 * | 9/2011 | Vogan | G06F 12/04 711/4 |
| 9,218,286 | B2 * | 12/2015 | Biswas | G06F 12/0804 |
| 9,612,972 | B2 * | 4/2017 | Roberts | G06F 12/0895 |
| 2009/0006923 | A1 * | 1/2009 | Gara | H03M 1/0687 714/758 |
| 2010/0251036 | A1 * | 9/2010 | Moyer | G06F 11/1064 714/53 |

* cited by examiner

*Primary Examiner* — Christopher B Shin
(74) *Attorney, Agent, or Firm* — Lowenstein Sandler LLP

(57) ABSTRACT

A method comprising identifying a portion of data in a first memory component to be written to a managed unit of a second memory component and determining whether an additional portion of data in the first memory component associated with the managed unit is stored at the cache memory. The method further includes generating a bit mask identifying locations of the managed unit associated with the portion of data and the additional portion of data and performing, based on the bit mask, a write operation comprising the portion of data and the additional portion of data to the managed unit of the second memory component.

17 Claims, 7 Drawing Sheets

BIT MASKING VALID SECTORS FOR WRITE-BACK COALESCING

TECHNICAL FIELD

Embodiments of the disclosure relate generally to memory sub-systems, and more specifically, relate to bit masking valid sectors for write-back coalescing.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
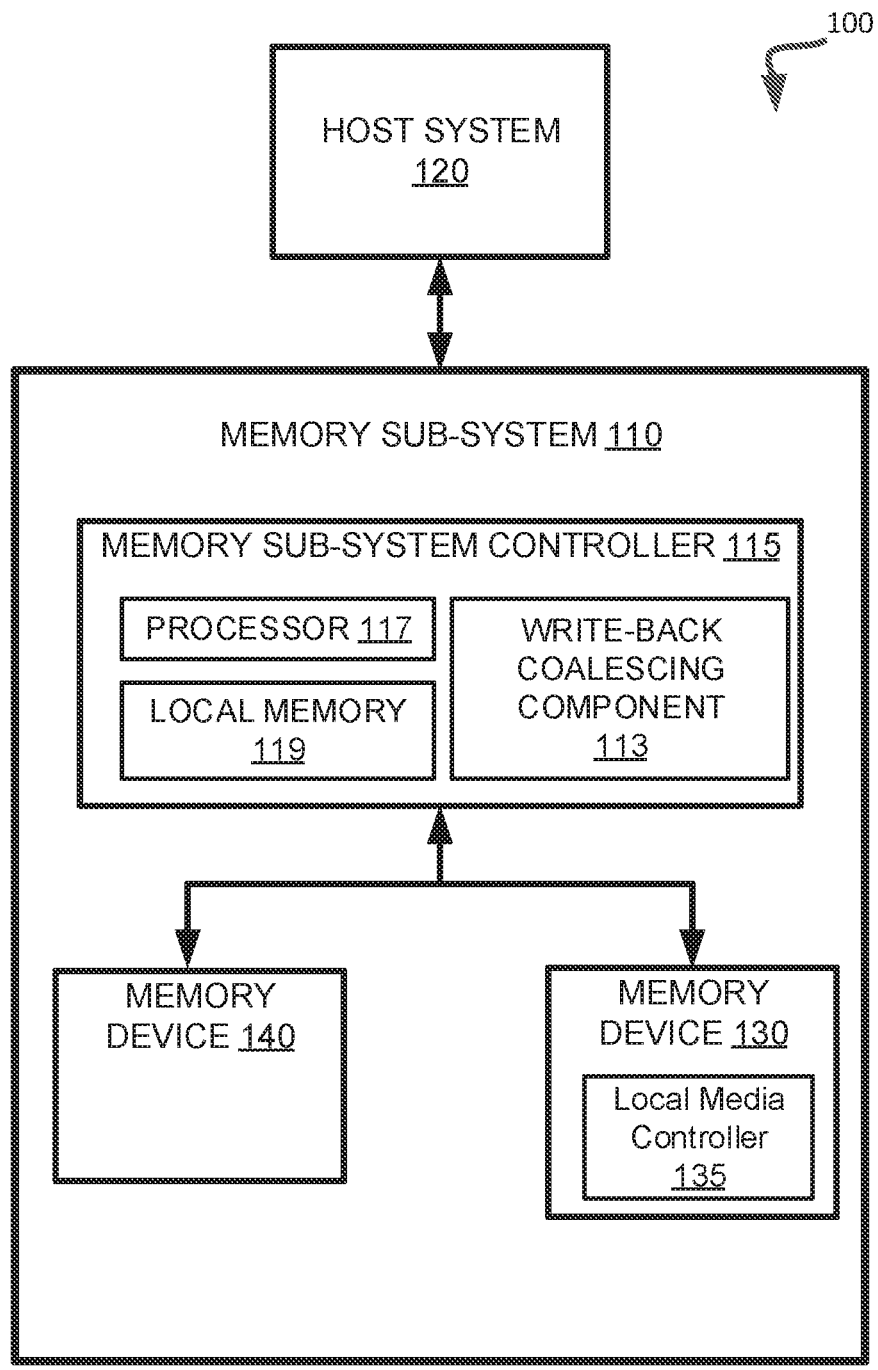
FIG. 1 illustrates an example computing environment that includes a memory sub-system, in accordance with some embodiments of the present disclosure.

Aspects of the present disclosure are directed to bit masking valid sectors for cache write-back coalescing. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory module can include a memory component, such as three-dimensional cross-point (3DXP) memory. The memory component can have a large data access granularity compared to the access granularity of another memory component, such as a cache media. Data access granularity can be the size of data that can be retrieved from a memory component in a single operation. The larger the data access granularity, the larger the amount of data that can be retrieved from a memory component in a single operation. Due to the disparity between the access granularity of the cache media and the memory component, write-backs from the cache media to the memory component can require additional operations, such as a read-modify-write operation. A write-back can be a write of new or updated data from a cache at which the data is modified (based on writes received from a host system) to a memory component where the data is stored. The read-modify-write operation can include reading an entire managed unit from the memory component, modifying the data (i.e., the modify portion of a read-modify-write operation) of the managed unit according to the write from the cache media and writing the modified data of managed unit back to the memory component. A managed unit can be a set of smaller portions of data, referred to as codewords, which are grouped together for media management and data access purposes. In some instances, the cache media can include multiple portions of data, or cache lines, associated with codewords of the managed unit.

The codewords of the managed unit can be modified (i.e., written to) while in the cache media as cache lines and then written back to the managed unit. When a codeword is written to in the managed unit, a redundant array of independent disks (RAID) parity bit codeword can also be modified based on the new data written to the codeword. The RAID codeword can be used for data protection of the codewords included in the managed unit. The RAID parity codeword can be updated according to the modified codeword. In conventional memory modules, the multiple cache lines in the cache media can require multiple read-modify-write operations to write all the codewords from the cache lines back to the managed unit. Updating the RAID parity codeword can also include additional operations to update according to each modified codeword individually. The multiple writes and RAID bit updates for the additional codewords can increase latency and reduce system performance. The additional writes and RAID update operations can also increase media wear.

Aspects of the present disclosure address the above and other deficiencies by providing the ability to coalesce writes to a common managed unit using a bit mask. A cache controller can manage the cache media and determine the data to be stored or removed from the cache media. If the cache controller determines that a cache line corresponding to a codeword in the MU is to be written back to the MU, the cache controller can also determine whether additional cache lines correspond to a codeword of the MU. If there are any additional cache lines corresponding to the MU to be written back to the media, the cache controller can generate a bit mask identifying the codeword locations of the cache lines to be written back to the MU. The cache lines can then be written to the MU in a single write operation using the bit mask. For example, a media manager can receive each of the cache lines and the bit mask from the cache controller and interpret the bit mask to identify the codeword locations in the MU to write each cache line to. The media manager can read the MU, modify the MU by applying the mask and inserting the cache lines to the corresponding codeword locations, and then write the modified MU back to the media. The media manager can update the RAID codeword by reading the RAID codeword and performing a logic operation according to each of the modified codeword prior to writing it back to the managed unit.

Therefore, the ability to coalesce write-back operations using a bit mask could increase the lifetime of memory sub-systems due to reduction in read-modify-write operations and reading and writing of RAID parity bits at the media. The write latency of the memory sub-system could be reduced because the cache media is managed more efficiently by writing-back all sectors or codewords in the cache media that belong to a common managed unit in a single write operation. Finally, the write latency could be reduced due to reduction in the number of read and writes of the RAID codeword.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a write-back coalescing component 113 that can be used to coalesce write-backs from cache media to a memory component. In some embodiments, the memory sub-system controller 115 includes at least a portion of the write-back coalescing component 113. For example, the memory sub-system controller 115 can include a processor 117 (processing device) configured to execute instructions stored in local memory 119 for performing the operations described herein. In some embodiments, the write-back coalescing component 113 is part of the host system 110, an application, or an operating system.

The write-back coalescing component 113 can identify cache lines in a cache media corresponding to codewords of a single managed unit of a memory component. The write coalescing component 113 can generate a bit mask for the cache lines corresponding to the codewords of the managed unit in the memory component. The write-back coalescing component 113 can write the cache lines to the managed unit in a single write using the bit mask to identify codeword locations of the managed unit to write the cache lines to. Further details with regards to the operations of the write-back coalescing component 113 are described below.

Figure 2:
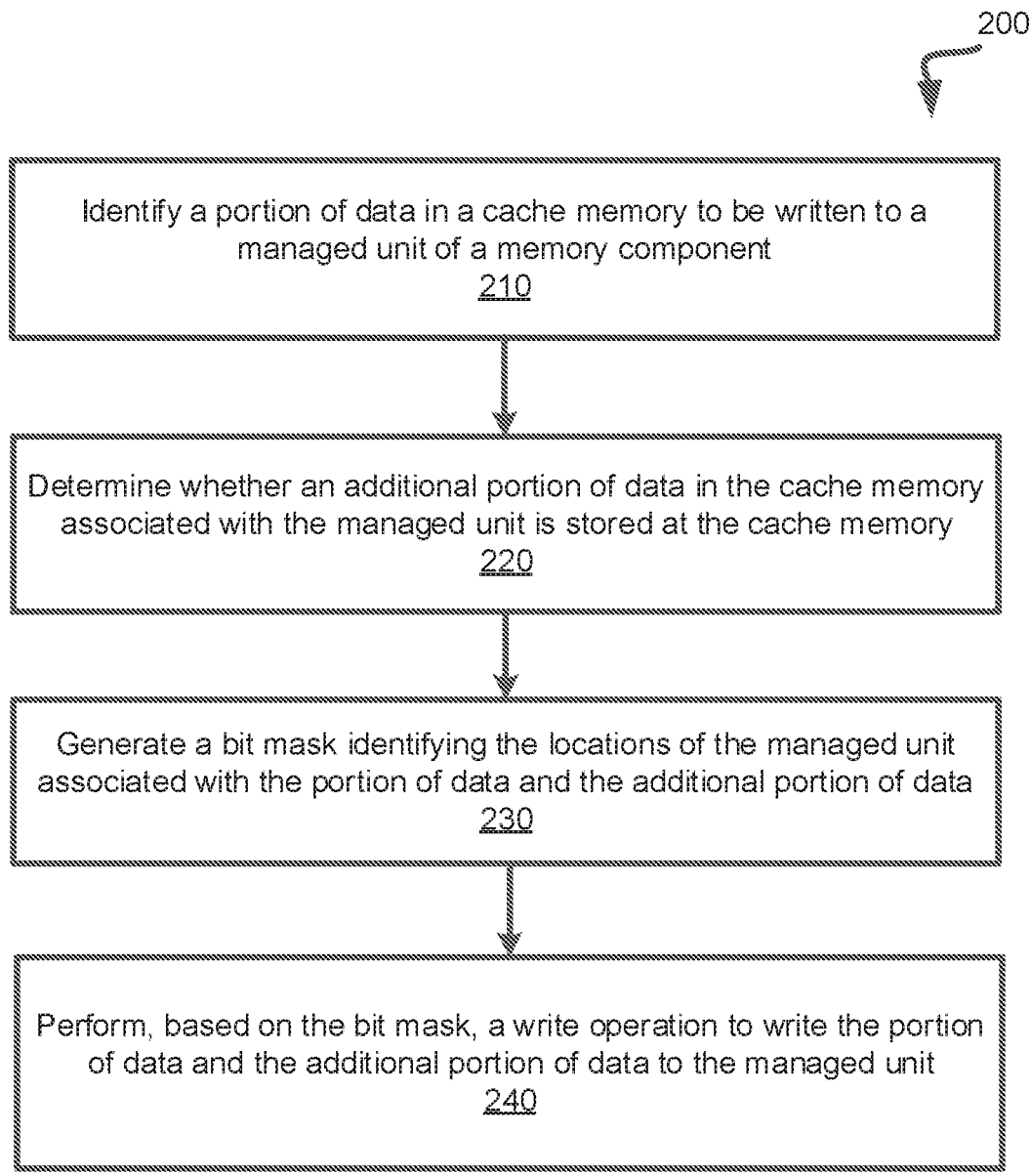
FIG. 2 is a flow diagram of an example method to generate a bit mask for write-back coalescing, in accordance with some embodiments of the present disclosure.

FIG. 2 is a flow diagram of an example method 200 to generate a bit mask for write-back coalescing, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the write-back coalescing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic of a memory sub-system identifies a portion of data in a cache memory to be written to a managed unit of a memory component. The portion of data in the cache memory can be a cache line of data stored in the cache memory. A cache line can be a certain amount of data, such as a sector or codeword of the managed unit. A cache controller can include caching policies, such as eviction policies, in which cache lines stored in the cache memory are written back to the managed unit of the memory component under certain conditions. For example, a cache line can be evicted from the cache media when a new codeword is to be written to the cache media and the cache line is the least recently used cache line. Additionally, when a cache line in the cache memory has been modified (i.e., is dirty) then that data should be written back to the managed unit to store the data prior to removing the data from the cache media. In another example, all cache lines stored in the cache media are written back to the memory component upon eviction.

The cache line can be associated with a particular location within the managed unit of the memory component. The particular location within the managed unit can be referred to as a sector, or a codeword. A codeword can contain a particular amount of data (e.g., 64 bytes, 128 bytes, etc.) When a codeword is accessed, by a host system it can be retrieved from the managed unit of the memory component and placed in the cache memory from which the host system can access the data quickly. Any modifications that are made to the data in the cache memory may not be immediately written to the managed unit of the memory component. Thus, the modifications to the data can be written back to the managed unit on the media to ensure that the changes to the data persist.

At operation 220, the processing logic determines whether an additional portion of data in the cache memory associated with the managed unit is stored at the cache memory. The additional portion of data in the cache memory can be another cache line of data stored in the cache memory. The additional portion of data in the cache memory can be associated with another location (i.e., codeword) within the managed unit. The cache controller can determine that portion of data and the additional portion of data are associated with the same managed unit using their corresponding addresses. The managed unit can have a base address and include all data within a defined number of bytes from the base address. For example, the managed unit can contain one kilobyte of data, which is segmented into eight portions of 128 byte codewords. The managed unit can thus include all addresses from the base address to the base address plus one kilobyte. Once the cache controller identifies the portion of data at operation 210, the cache controller can identify the base address of the managed unit and then determine whether any other portions of data within the cache memory have addresses within the managed unit's address range.

At operation 230, the processing logic generates a bit mask identifying the locations of the managed unit associated with the portion of data and the additional portion of data. The bit mask can include a bit for each codeword located within the managed unit. Thus, each bit can indicate whether the cache memory includes a portion of data associated with each particular codeword. For example, each bit that is set as a 1 can indicate that cache line is stored in the cache media corresponding to that codeword, and each bit set as a 0 indicates that the cache memory does not include data for the corresponding codeword, or vice versa.

At operation 240, the processing logic performs, based on the bit mask, a write operation to write the portion of data and the additional portion of data to the managed unit. The write coalescing component can interpret the bit mask, the portion of data, and the additional portion of data to write the portion of data to its corresponding codeword of the managed unit and the additional portion of data to its corresponding codeword in a single write operation. To perform the write operation, the write coalescing component can perform a read-modify-write operation to the managed unit with both the portion of data and the additional portion of data. However, if the entire MU is present in the cache memory, then the processing logic can perform a write of the full MU rather than a read-modify-write. The processing logic can read the entire managed unit and then modify a first and second codeword with the portion of data and the additional portion of data according to the bit mask. The bit mask can identify the first codeword to modify with the portion of data, and the second codeword to modify with the additional portion of data. Once the appropriate codewords are modified, the processing logic can write the entire modified managed unit back to the memory component. Thus, rather than performing two separate read-modify-write operations to write the portion of data and the additional portion of data to the managed unit, the processing logic coalesces the writes into a single read-modify-write operation. This can be done for any number of cache lines in the managed unit. For example, any number of codewords, up to the number of codewords in a managed unit, can be coalesced in the single write operation. Additionally, if all codewords of the managed unit are stored in the cache memory then a write operation of the entire managed unit can be performed rather than a read-modify-write.

In addition, the processing logic can additionally update a RAID parity codeword of the managed unit when the write operation is performed. To update the RAID parity bits of the managed unit, the processing logic can perform a logic operation on the RAID parity bits and each of the modified codewords. For example, the processing logic can perform an XOR operation of the first codeword and the RAID parity bits and another XOR operation on the second codeword and the RAID parity bits resulting from the previous XOR operation. The processing logic can then write the updated RAID parity bits back to the managed unit.

Figure 3:
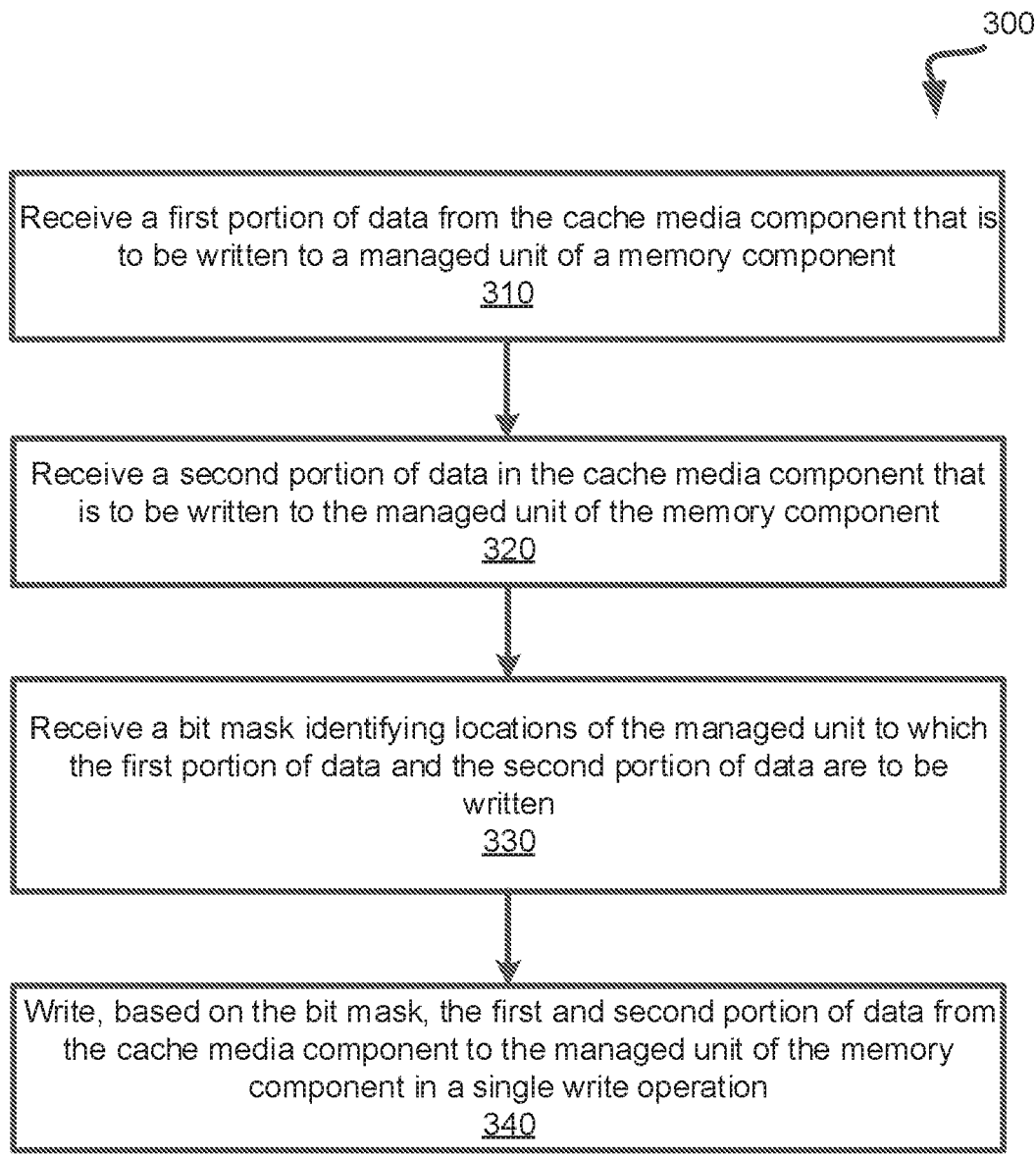
FIG. 3 is a flow diagram of an example method to perform a write operation using a bit mask for write-back coalescing, in accordance with some embodiments of the present disclosure.

FIG. 3 is a flow diagram of an example method 300 to perform a write operation using a bit mask for write-back coalescing, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the write-back coalescing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, processing logic of a memory subsystem receives a first portion of data from a cache media component that is to be written to a managed unit of a memory component. The first portion of data can be a cache line stored in the cache media component. The first portion of data can correspond to a sub-set of data stored at the managed unit (i.e., a codeword) of the memory component. The managed unit can be a larger collection of codewords that are grouped together for memory management and data access. In some embodiments, the managed unit corresponds to the access granularity of the memory component. The first portion of data can thus be a cache line that is associated with a particular codeword of the managed unit. The first portion of memory can be smaller than the access granularity of the managed unit and therefore to write the portion of data, the processing logic can perform a read-modify-write operation on the managed unit. The processing logic can read the data of the entire managed unit, modify one or more codewords of the managed unit and then write the modified data back to the managed unit.

At operation 320, the processing logic receives a second portion of data in the cache media component that is to be written to the managed unit of the memory component. The second portion of data can be data that is associated with a second codeword of the managed unit. Thus, both the first and second portions of data (or cache lines) are to be written to different codewords of the same managed unit. Additionally, any number of additional portions of data can be identified as to be written to the same managed unit.

At operation 330, the processing logic receives a bit mask identifying locations of the managed unit to which the first portion of data and the second portion of data are to be written. The bit mask can be a series of bits corresponding to codewords of the managed unit. Each bit of the bit mask can indicate whether new data is to be written to the corresponding codeword. For example, each bit that is set as a 1 can indicate that cache line is stored in the cache media corresponding to that codeword, and each bit set as a 0 indicates that the cache memory does not include data for the corresponding codeword, or vice versa. Thus, a first bit of the bit mask can indicate that the first portion of data is to be written to a first codeword and that the second portion of data is to be written to a second codeword. The first and second codeword can be non-adjacent, non-contiguous codewords.

At operation 340, the processing logic writes, based on the bit mask, the first and second portion of data from the cache media component to the managed unit of the memory component in a single write operation. To perform the write operation, the write coalescing component can perform a read-modify-write operation to the managed unit with both the first portion of data and the second portion of data. The processing logic can read the data from the entire managed unit and modify a first and second codeword with the first portion of data and the second portion of data, according to the bit mask. The bit mask can identify the first codeword to modify with the first portion of data, and the second codeword to modify with the second portion of data. Once the appropriate codewords are modified, the processing logic can write the entire modified managed unit back to the memory component. Thus, rather than performing multiple read-modify-write operations to write the first portion of data and the second portion of data to the managed unit, the processing logic coalesces the writes into a single read-modify-write operation. This coalescing can be done for any number of cache lines in the managed unit. For example, two, three, four, or more cache lines can be coalesced in a single write operation.

Figure 4:
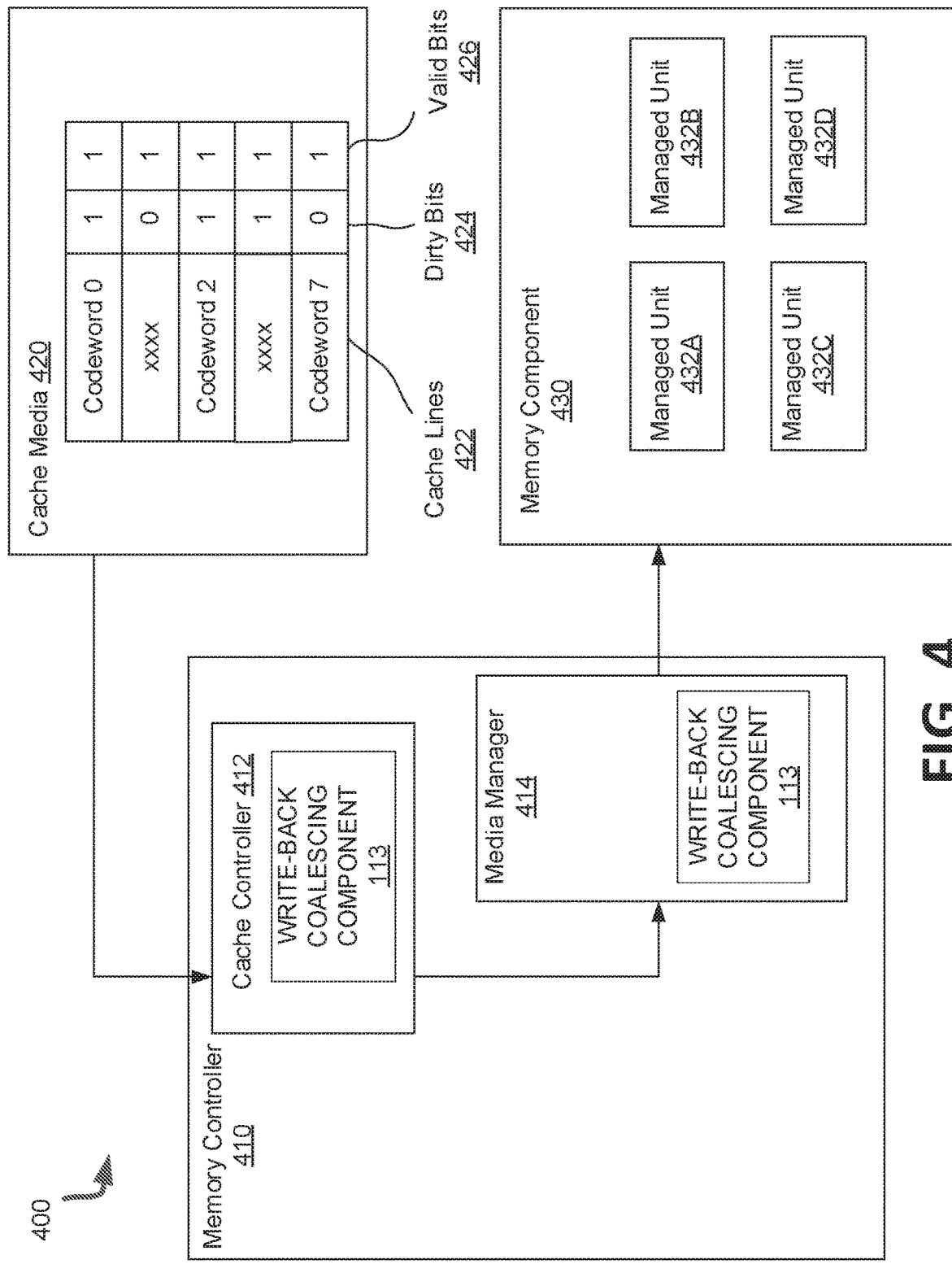
FIG. 4 illustrates a memory sub-system using a bit mask for write-back coalescing in accordance with some embodiments of the present disclosure.

FIG. 4 depicts a memory sub-system 400 using a bit mask for write-back coalescing. The memory sub-system 400 includes a memory controller 410, a cache media 420, and a memory component 430. The memory controller 410 includes a cache controller 412 and a media manager 414, each of which include a write coalescing component 113. The memory controller 410 can manage storage of data in the memory sub-system 400 and the transfer of data between memory components of the memory sub-system 400, such as the cache media 420 and memory component 430. The cache controller 412 can include caching polices to manage data from the memory component 430 that is cached in the cache media 420. The cache controller 412 can determine which data to cache, which data to write-back to the memory component 430, and which data to remove from the cache media 420. Media manager 414 of the memory controller 410 can manage the data stored at the memory component 430.

The media manager 414 can access and manage the data in the memory component 430 in one or more groups of data referred to as managed units 432A-D. Although depicted as separate components, the cache controller 412 and media manager 414 can both be included in a single component of the memory controller 410. The media manager 414 can also manage error correction code (ECC) and redundant arrays of independent disk (RAID) parity bits. The ECC and RAID parity bits can provide error correction and memory protection in case of errors or loss of portions of data. The media manager 414 can update the RAID parity bits with each modification to the data of a managed unit 432A-D. Each managed unit 432A-D can have a RAID parity bit codeword that is read from the managed unit and updated based on the new data that is written to the managed unit then written back to the managed unit. In one example, the RAID parity bits are updated by an "exclusive or" (XOR) logic operation between the RAID parity bits and the new codewords written to the managed unit.

Cache media 420 can be a low latency memory such as DRAM, or SRAM. Portions of data from the memory component 430 can be stored at the cache media 420 (i.e., cache lines 422) so that the data can be accessed quickly by a host system. The cache media 420 can store codewords from managed units 432A-D of the memory component 430 as cache lines which can be accessed and modified by the host system. The cache media 420 can additionally store cache line metadata associated with each cache line indicating a status of the corresponding cache line 422, such as a dirty bit 424 and a valid bit 426. In some embodiments, the cache controller 412 can use the dirty bits 424 and valid bits 426 to determine whether a cache line has been modified and whether it should be written back to the memory component 430. For example, as depicted in FIG. 4, "codeword 0," "codeword 2," and "codeword 7" are each indicated as dirty and valid. Thus, codewords 0, 2, and 7 contain valid and dirty data and will each need to be written back to the memory component 430 before being removed from the cache media 420 to ensure the modifications persist.

Memory component 430 can be emerging memory, flash memory, 3DXP, DRAM, etc. Memory component 430 can be a type of media that has a larger access granularity and higher access latency than the cache media 420. Memory component 430 can include one or more managed units 432A-D, each including multiple codewords, and/or sectors, of data. The media manager 414 can write to each codeword of the managed units 432A-D through a read-modify-write operation. Thus, although the media manager accesses the memory component 430 at a managed unit granularity, each codeword can be read and written individually through additional operations (read-modify-write), which can increase the latency of the memory component 430.

Figure 5:
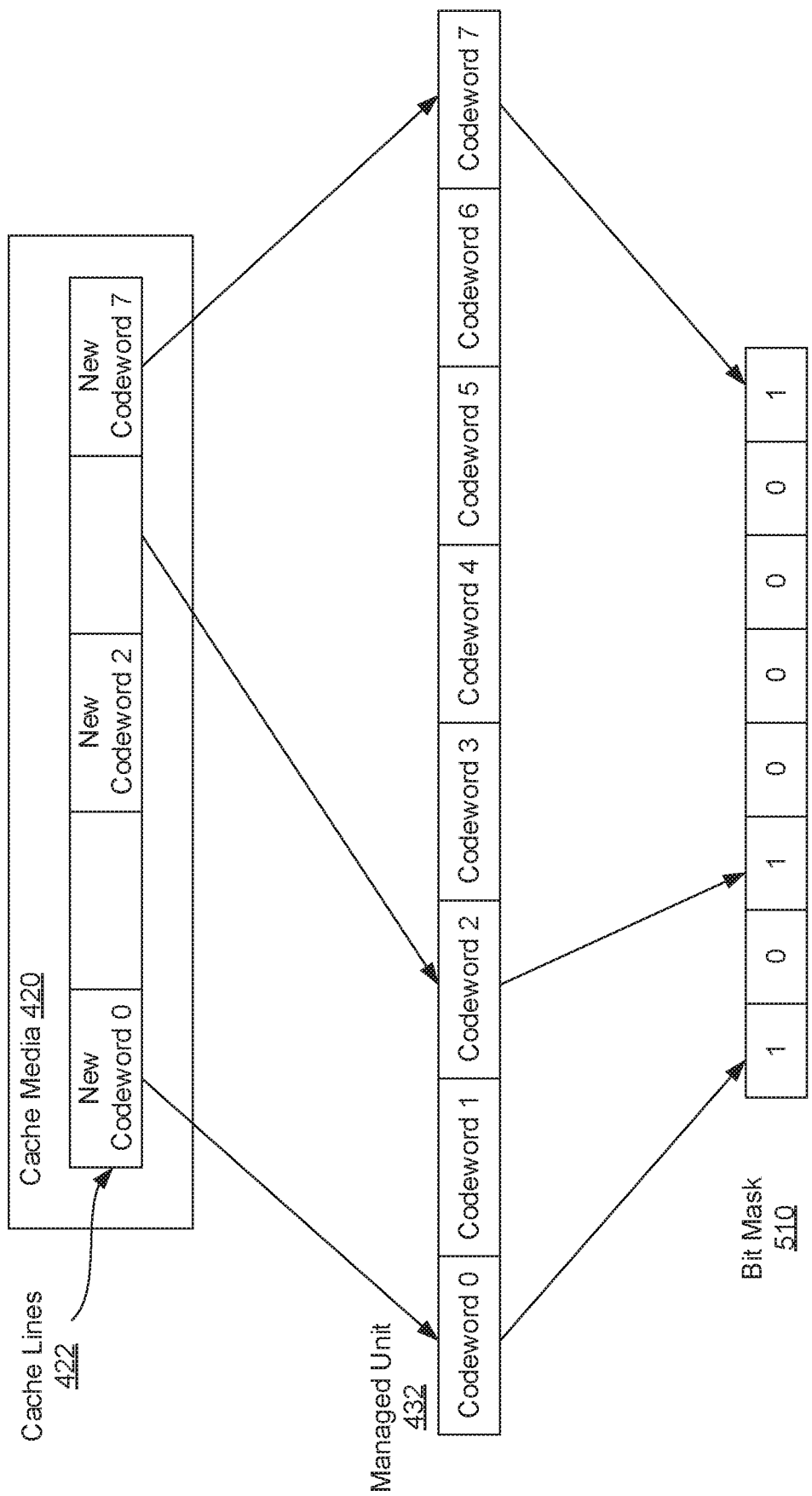
FIG. 5 is illustrates generation of data bit mask based on codewords stored in cache media in accordance with some embodiments of the present disclosure.
Figure 6:
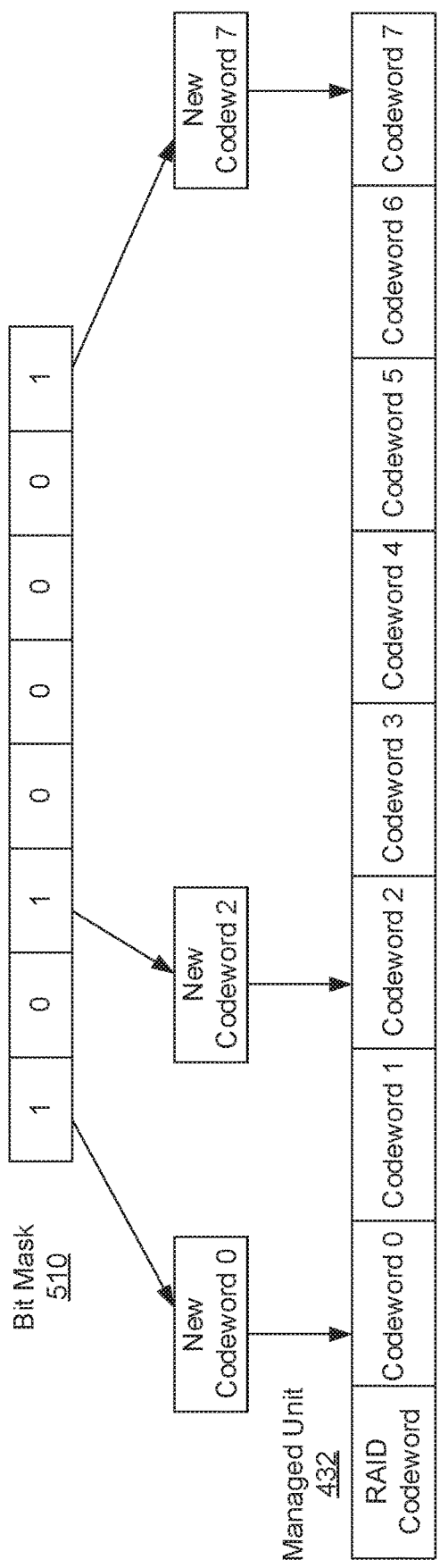
FIGS. 6A and 6B illustrate using a bit mask to write multiple codewords to a managed unit in a single write operation in accordance with some embodiments of the present disclosure.

In one example, as further illustrated by FIGS. 5 and 6A-B, the write coalescing component 113 can identify a first cache line in the cache media 420 that is to be written back to the memory component 430. The write coalescing component 113 then identifies any additional cache lines that can be written back to the same managed unit as the first cache line. For example, codeword 0, 2, and 7 can each correspond to a codeword of managed unit 432A. The write coalescing component can then generate a bit mask identifying the codewords of the managed unit that the cache lines 0, 2, and 7 are to be written to. Using the bit mask, the write coalescing component 113 of the media manager 414 can write each of the cache lines 0, 2, and 7 to the managed unit 432A in a single write operation. Additionally, the write-back coalescing component 113 of the media manager 414 can read and update the RAID parity bits of the a managed unit 432A-D to which the operation occurs in a single logical operation before writing the RAID parity bits back to the managed unit 432A-D.

FIG. 5 illustrates generation of a bit mask based on codewords stored in cache a media (e.g., cache media 420 of FIG. 4). The write coalescing component 113, depicted in FIGS. 1 and 4, can identify each cache line 422 that is associated with a single managed unit 432 to generate a bit mask 510. The cache lines 422 can include data from a codeword of the managed unit 432. Additionally, while in the cache media the codewords can be modified to be a new codeword that is to replace the previous codeword of the managed unit 432. For example, a cache line 422 of the cache media 420 can include "new codeword 0" which corresponds to codeword 0 of the managed unit 432. The cache media 420 can additional include a new codeword 2 and a new codeword 7, corresponding to codeword 2 and codeword 7 of the managed unit, respectively. Each new codeword can be a clean version, a modified version, or a complete replacement of the original codeword from the managed unit 432. As depicted, the bit mask 510 can then be generated to identify each of the codewords of the managed unit 432 that the new codewords correspond to. New codeword 0 corresponds to codeword 0 of the managed unit 432, which is located at the first position in the managed unit 432. Thus, the bit of the bit mask 510 corresponding to the first position can be set to "1," identifying that new codeword 0 is to be written to the first position of the managed unit 432, replacing codeword 0. Similarly, new codeword 2 corresponds to position 3 of the managed unit. Thus, the bit of the bit mask 510 corresponding to position 3 can be set to a "1." Finally, new codeword 7 can correspond to codeword 7 at position 8. Thus, the bit of the bit mask 510 corresponding to position 8 can be set to "1."

FIG. 6A is a diagram illustrating using a bit mask to perform write-back coalescing. The bit mask 510, generated according to FIG. 5, can be used by a write coalescing component 113 to write multiple codewords to the managed unit 432 in a single write operation. The bit mask 510 includes bits corresponding to each codeword of the managed unit 432. Each bit of the bit mask 510 can indicate whether a cache line corresponding to the codeword is stored in the cache media and/or should be written to the corresponding codeword.

For example, as depicted in FIG. 6A, bits 0, 2, and 7 are set to 1 to indicate that the corresponding codeword is to be written to. From FIG. 5, the new codeword 0 is identified based on its address and the bit 0 of the bit mask 510 as the new codeword to be written to the location of codeword 0. The new codeword 2 is identified based on its address and bit 2 of the bit mask 510 as the new codeword to be written to the location of codeword 2. The new codeword 7 is identified based on its address and bit 8 of the bit mask 510 as the new codeword to be written to the location of codeword 7.

FIG. 6B is a diagram illustrating a resulting managed unit after using a bit mask to perform write-back coalescing, as depicted in FIG. 6A. As depicted, during the write operation the codewords identified by the bit mask 510 can be replaced by the new codewords from the cache lines of the cache media. Although not depicted, the managed unit 432 can include a RAID parity bit codeword. A memory manager can use the RAID parity bits to reproduce codewords that have been corrupted. The memory manager can update the RAID parity bits when new codewords are written to the managed unit 432.

Figure 7:
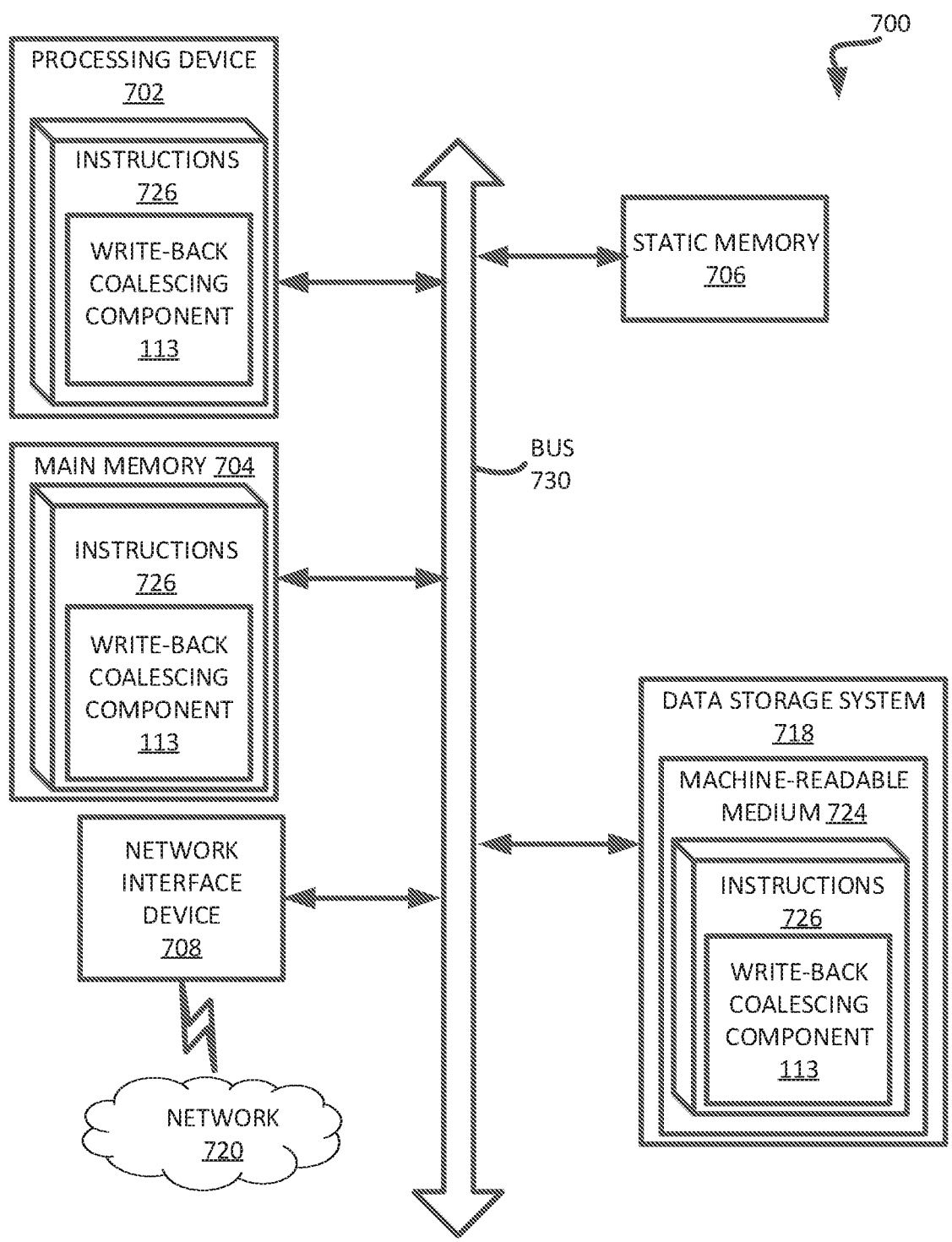
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the write-back coalescing component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a program pulse control component (e.g., the program pulse control component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    identifying a portion of data in a first memory component to be written to a managed unit of a second memory component;
    determining whether an additional portion of data in the first memory component and associated with the managed unit is stored at the first memory component;
    generating a bit mask identifying a first location and a second location in the managed unit, wherein the first location is associated with the portion of data and the second location is associated with the additional portion of data; and
    performing, based on the bit mask, a write operation to write the portion of data to the first location in the managed unit of the second memory component and the additional portion of data to the second location in the managed unit of the second memory component, wherein performing the write operation comprises updating a parity codeword associated with the managed unit based on the portion of data and the additional portion of data.

2. The method of claim 1, wherein updating the parity codeword comprises:
    reading the parity codeword from the second memory component;
    performing an operation to obtain a new parity codeword based on the parity codeword and each of the portion of data and the additional portion of data; and
    writing the new parity codeword to the managed unit to replace the parity codeword.

3. The method of claim 1, wherein the first location and the second location in the managed unit corresponding to the portion of data and the additional portion of data are non-contiguous locations.

4. The method of claim 1, wherein the write operation comprises a read-modify-write operation of the managed unit.

5. The method of claim 4, wherein the managed unit comprises a plurality of codewords and wherein the portion of data is written to a first codeword of the plurality of codewords and the additional portion of data is written to a second codeword of the plurality of codewords.

6. The method of claim 5, wherein determining whether the additional portion of data in the first memory component, and associated with the managed unit, is stored at the same first memory component comprises:
    determining a base address of the managed unit;
    identifying an address of the additional portion of data; and
    determining whether the address of the additional portion of data is located within a defined address range from the base address of the managed unit.

7. A system comprising:
    a memory device;
    a cache media device; and a processing device, operatively coupled with the memory device and the cache media device, to perform operations comprising:
    receiving a first portion of data from the cache media device that is to be written to a managed unit of the memory device;
    receiving a second portion of data in the cache media device that is to be written to the managed unit of the memory device;
    receiving a bit mask identifying a first location in the managed unit to which the first portion of data is to be written and a second location in the managed unit to which the second portion of data to be written;
    writing, based on the bit mask, the first portion of data from the cache media device to the first location in the managed unit of the memory device and second portion of data from the cache media device to the second location in the managed unit of the memory device in a single write operation; and
    updating a parity codeword associated with the managed unit based on the first portion of data and the second portion of data.

8. The system of claim 7, wherein the managed unit comprises a plurality of codewords and wherein the first portion of data is written to a first codeword of the plurality of codewords and the second portion of data is written to a second codeword of the plurality of codewords.

9. The system of claim 8, wherein the first codeword and the second codeword are non-contiguous codewords.

10. The system of claim 7, wherein updating the parity codeword comprises:
    reading the parity codeword from the memory device;
    performing an operation on the parity codeword comprising an XOR of the parity codeword and each of the first portion of data and the second portion of data to obtain a new parity codeword; and
    writing the new parity codeword to the managed unit to replace the parity codeword.

11. The system of claim 7, wherein the single write operation comprises a read-modify-write operation of the managed unit.

12. A non-transitory computer-readable storage medium comprising instructions that, when executed by a processing device, cause the processing device to execute operations comprising:
    identifying a portion of data in a first memory component to be written to a managed unit of a second memory component;
    determining whether an additional portion of data in the first memory component associated with the managed unit is stored at the first memory component;
    generating a bit mask identifying a first location and a second location in the managed unit, wherein the first location is associated with the portion of data and the second location is associated with the additional portion of data; and
    performing, based on the bit mask, a write operation to write the portion of data to the first location in the managed unit of the second memory component and the additional portion of data to the second location in the managed unit, wherein performing the write operation comprises updating a parity codeword associated with the managed unit based on the portion of data and the additional portion of data.

13. The non-transitory computer-readable storage medium of claim 12, wherein updating the parity codeword comprises:
    reading the parity codeword from the second memory component;
    performing an operation to obtain a new parity codeword based on the parity codeword and each of the portion of data and the additional portion of data; and
    writing the new parity codeword to the managed unit to replace the parity codeword.

14. The non-transitory computer-readable storage medium of claim 12, wherein the first location and the second location in in the managed unit corresponding to the portion of data and the additional portion of data are non-contiguous locations.

15. The non-transitory computer-readable storage medium of claim 12, wherein the write operation comprises a read-modify-write operation of the managed unit.

16. The non-transitory computer-readable storage medium of claim 15, wherein the managed unit comprises a plurality of codewords and wherein the portion of data is written to a first codeword of the plurality of codewords and the additional portion of data is written to a second codeword of the plurality of codewords.

17. The non-transitory computer-readable storage medium of claim 16, wherein determining whether the additional portion of data in the first memory component, and associated with the managed unit, is stored at the same first memory component comprises:
    determining a base address of the managed unit;
    identifying an address of the additional portion of data; and
    determining whether the address of the additional portion of data is located within a defined address range from the base address of the managed unit.

* * * * *